Paul A. Mankin
Gerald J. Klopfenstein
James E. Doelling
INVENTOR.

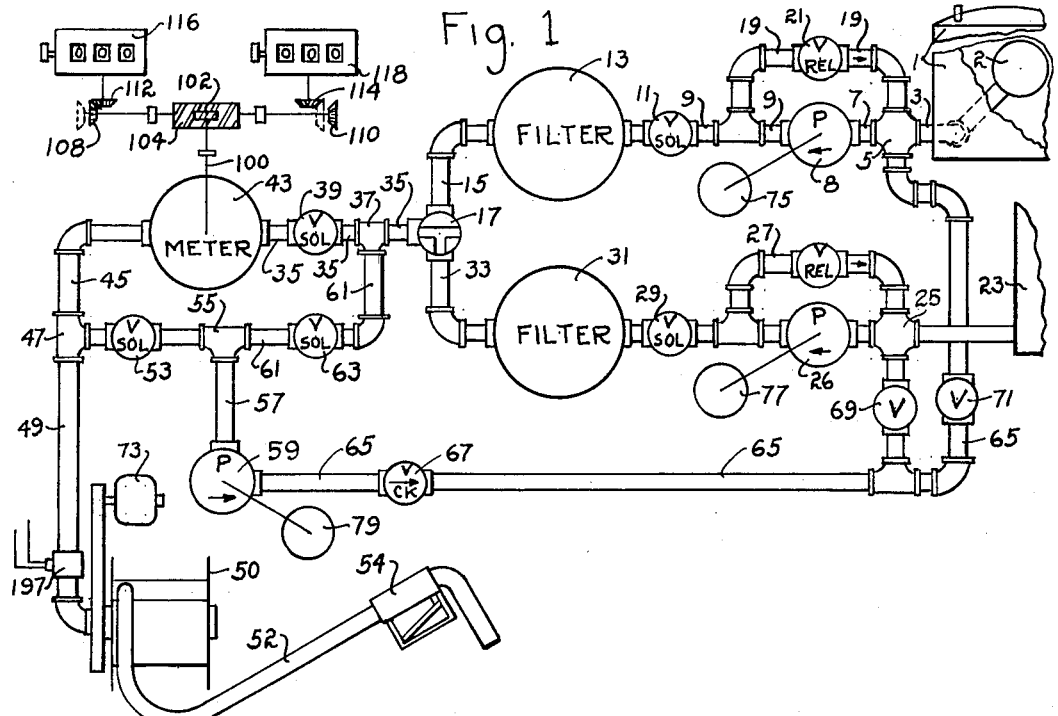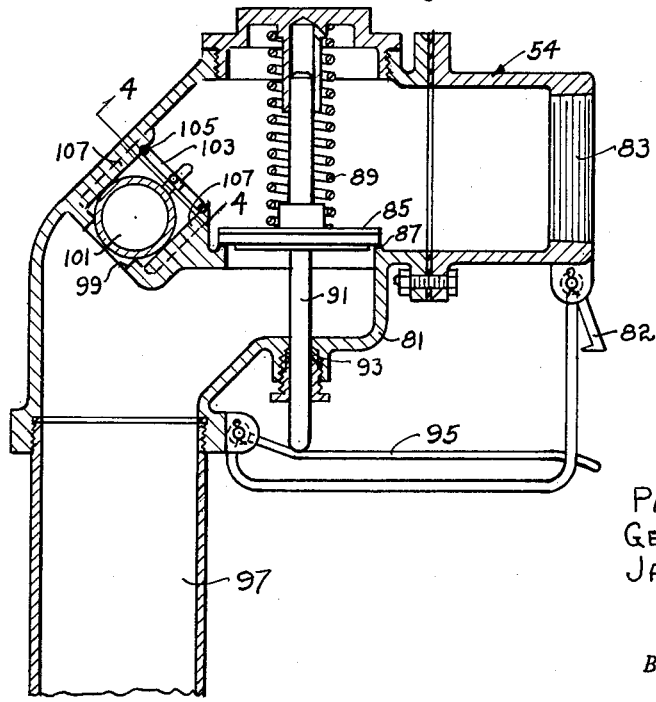

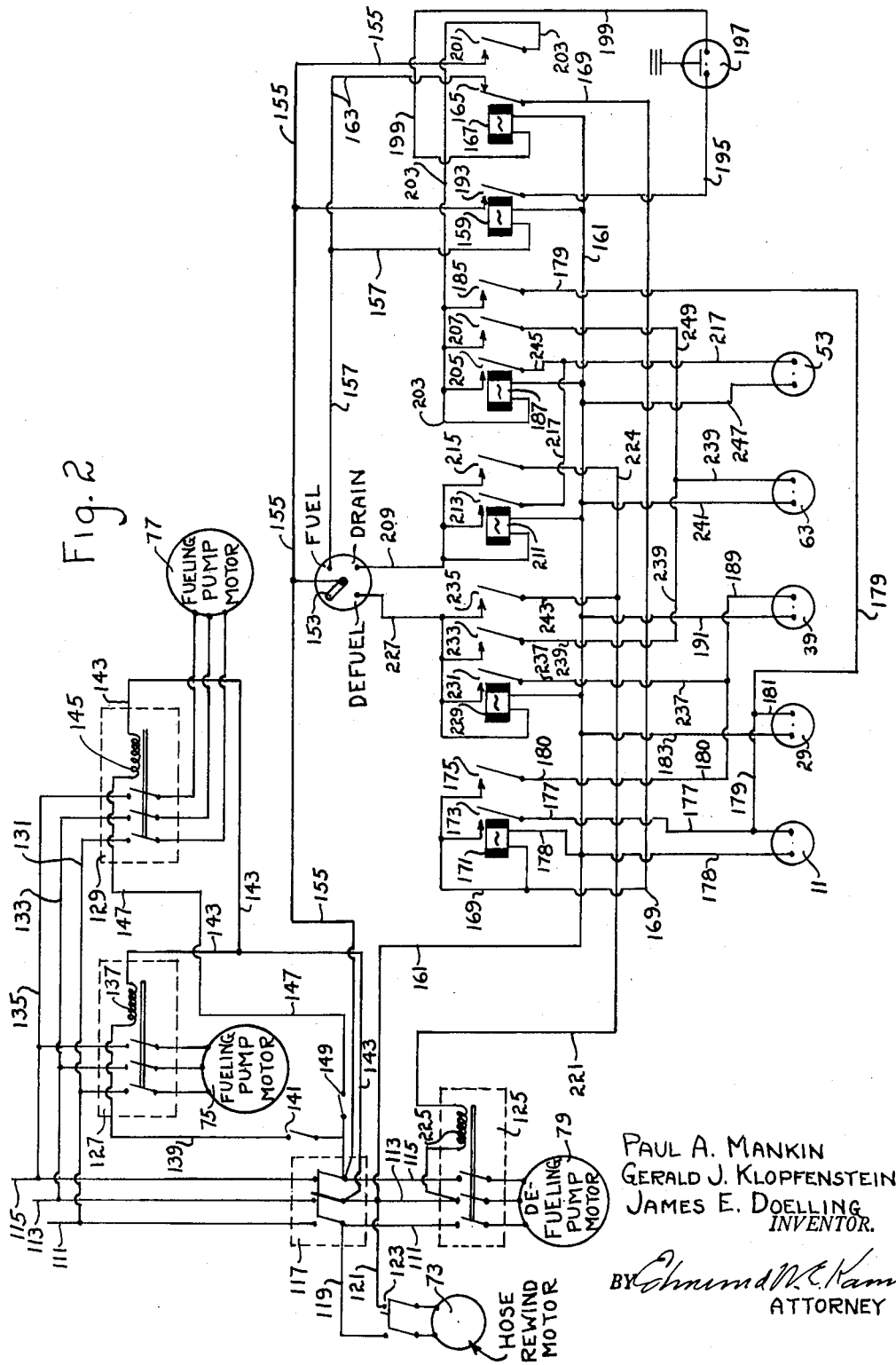

BY Edmund W. C. Kamm
ATTORNEY

# United States Patent Office 2,731,171
Patented Jan. 17, 1956

2,731,171
FUEL HANDLING SYSTEM

Paul A. Mankin, Gerald J. Klopfenstein, and James E. Doelling, Fort Wayne, Ind., assignors to Bowser, Inc., Fort Wayne, Ind., a corporation of Indiana Application September 27, 1949, Serial No. 118,114

6 Claims. (Cl. 222—26)

This invention relates to a fuel dispensing system. More specifically, it relates to a system for fueling aircraft, for defueling aircraft or for partially evacuating the hose as required by servicing operations.

The tendency in fueling systems for large modern airports is toward the use of large diametered fueling hose of four inches and upward. The hose and fuel contained therein are very heavy and it requires a great effort on the part of the operator to withdraw the hose from a fueling pit, to carry it to the plane and lift it into position to discharge into the fill pipe. Further, where top wing fueling is required, there is danger of damage to the wing when a heavy hose is dragged across it into position.

It is also necessary at times to remove fuel from the tanks and it is desired to accomplish this with substantially the same equipment which is used for fueling.

Further, it is desired to discharge fuel at rates of 600 G. P. M. or more and, since the velocity of flow must be relatively low to prevent damage to the fuel tanks of the airplane, it is necessary to use large diametered hose and nozzles.

Furthermore, it is necessary to maintain the accuracy of measurement of the liquid supplied to or removed from the airplanes. It is an object of the invention to provide a fuel handling system which will meet the requirements set forth above.

Another object of the invention is to provide means for substantially evacuating the hose without collapsing it.

A further object of the invention is to provide a system which is relatively simple and easy to operate.

Yet another object of the invention is to provide a system in which one of a number of different grades of fuel may be dispensed with a minimum of commingling of the fuels.

These and other objects will become apparent from a study of this specification and the drawings which are attached hereto, made a part hereof and in which:

Figure 1 is a diagrammatic view of the dispensing system showing the piping, pumps, valves, meter, etc.

Figure 2 is a wiring diagram of the controls of the system of Figure 1.

Figure 3 is an elevation in section of the discharge nozzle showing particularly the liquid and air control valves.

LIQUID SYSTEM

Figure 5:
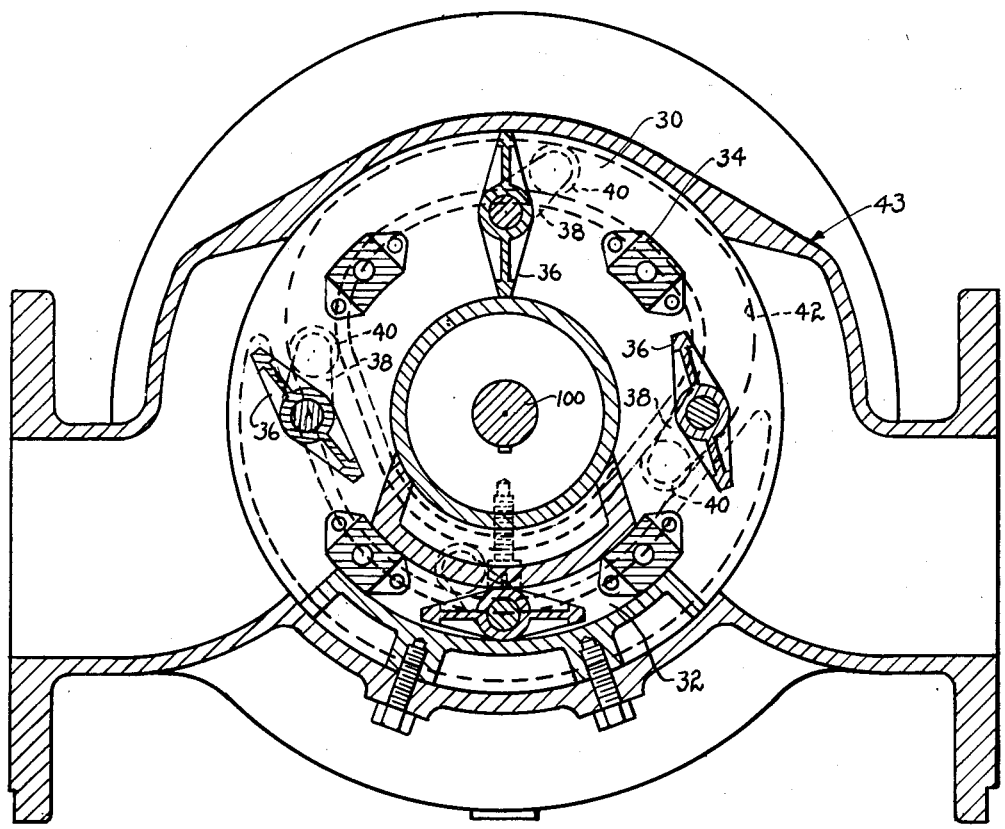
Figure 5 is a cross-sectional view of the reversible meter used in the system.

Referring now to Figures 1 and 2, the numeral 1 represents a storage tank for one grade of fuel from the bottom of which is connected a line 3, cross 5, line 7 and the suction side of a pump 8. The discharge pipe 9 from the pump is connected through a solenoid operated feed valve 11 to a filter 13.

The connection 3 preferably leads to a floating suction mechanism 2 in the tank so that the pump suction is always flooded and still does not pick up any water which may be in the tank.

The outlet 15 from the filter is connected to a manually operated three-way valve 17.

A by-pass line 19 having a pressure relief valve 21 therein, connects the pump discharge line 9 with the cross 5.

The system thus far described may be paralleled with one or more other systems for handling other grades of fuel. In order to simplify the description only one additional system will be described, but from this it will be obvious to those skilled in the art how additional systems can be added.

The second system includes the tank 23, cross 25, pump 26, by-pass 27, solenoid feed valve 29, filter 31 and line 33 which runs to the three-way valve 17.

The discharge line 35 from valve 17 runs through T 37, solenoid supply valve 39 to meter 43, which is preferably a reversible meter such as that disclosed in the application of Hosmer L. Blum, Serial No. 562,174, filed November 6, 1944 for Rotary Meter, now abandoned.

The meter preferably comprises a metering channel 30, a return channel 32, a rotor 34 having blades 36 which are operated by cranks 36 having rollers 40 running in a cam 42. The blades are swung from a position closing the metering channel to one in which they pass through the return channel. The meter may be driven in either direction by merely reversing the flow of fluid through it.

It is obvious, of course that any suitable reversible meter may be used.

The liquid discharged from the other side of the meter passes through line 45, T 47, line 49, pressure switch 197 to the hose reel 50 upon which is wound a hose 52 having a nozzle 54.

A solenoid valve 53 is connected at one side to T 47 and at the other side to T 55. The latter is connected by pipe 57 to the suction side of a defueling pump 59 and by line 61 through a solenoid valve 63 to T 37 of the meter supply line.

The defueling pump 59 discharges through line 65 and check valve 67. The line branches and one branch connects through a manually operated valve 69 into cross 25 while the other branch passes through manual valve 71 to T 5.

The hose reel 50 is preferably provided with an electric motor 73 and a suitable drive 75 for rewinding the hose on the reel. Pumps 8, 26 and 59 are similarly provided with suitable electric motors 75, 77 and 79 respectively.

Nozzle

Figure 4:
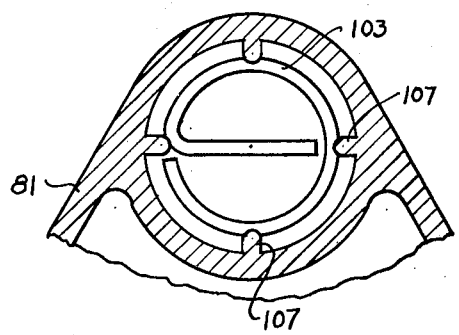
Figure 4 is a sectional view taken substantially on line 4—4 of Figure 3 showing the air valve.

Figures 3 and 4 indicate the nozzle 54 which is used on the end of the hose. This nozzle comprises a body 81 having an inlet connection 83 to receive the hose, a poppet type valve 85 which is urged toward closing position on seat 87 by spring 89. The stem 91 of the valve projects through a packing box 93 and is actuated by the trigger 95. A spout 97 serves as the discharge conduit. This structure is conventional. A latch 82 is provided to hold the valve open.

An additional port 99 connects the inlet 83 with the spout 97 and by-passes valve 85 and port 87. A ball valve 101 seats on the port to close it. A wire retainer 103 is supported in notches 105 formed in webs 107 which are parallel to the axis of the port. The webs serve as guides for the ball valve.

The ball may be of a yieldable material such as synthetic rubber to insure that it seats and closes the port.

The meter 43 drives a shaft 100 on which is mounted a helical gear 102 which drives a helical gear 104 fixed to shaft 106. Meter gears 108, 110 are attached to the ends of the shaft 106 and are adapted to mesh with gears 112, 114 respectively on the registers 116, 118.

As the direction of rotation of the meter changes the thrust of gear 102 on gear 104 shifts the shaft 106 and engages one or the other of the pairs of gears 108–112 or 110–114. Enough friction must be applied to shaft 106 to cause the shaft 106 to shift before it rotates.

Thus one or the other of the registers will be driven depending upon the direction of rotation of the meter.

The registers are preferably of the resettable type disclosed in the patent to Harvey E. Marvel, No. 2,272,417, issued February 10, 1942.

ELECTRICAL SYSTEM

Fueling

Referring to Figure 2, the lines 111, 113 and 115 represent the power supply mains. A main switch 117 is provided. The hose rewind motor 73 is connected across wires 111 and 113 by wires 119, 121 and a switch 123.

Switch 117 extends wires 111, 113 and 115 to the magnetic starter 125 which controls the defueling pump motor 79.

Branch wires 131, 133, 135 connect the wires 111, 113 and 115 with the magnetic starters 127 and 129 of the fueling pump motors 75 and 77.

The starting coil 137 of starter 127 is controlled by the circuit from main 115 at switch 117, through line 139, switch 141, coil 137 and line 143 to main 113. Starting coil 145 is supplied from main 115 at switch 117 by wire 147, switch 149, coil 145 and a branch of line 143 to main 113. Thus when either switch 141 or 149 is closed the corresponding starter will be energized to start the motor which it controls.

A manually operated selector switch 151 controls the operation of the system to fuel, defuel or drain and serves to energize the required solenoid valves to effect the operation desired.

We shall assume that the selector is set to the "Fuel" position:

Circuit A will be established from main 115 through wire 155, contact 153, line 157, 163, the normally closed switch 165 of relay 167, line 169, the magnet of relay 171, line 161 to main 113.

Circuit B is closed by the energization of relay 171 from line 169 (which is connected to main 115 as described) through normally open switch of relay 171, line 177, solenoid of valve 11, line 178 to 161 and main 113. The normally closed solenoid valve 11 is thus opened.

Circuit C through the solenoid of valve 29 is also energized by switch 173 since it is connected in parallel with valve 11 by lines 179, 181 and 183. Thus this valve, which is also normally closed, will be opened.

Circuit D is established by switch 175 as follows: from line 169 (connected to main 115) through normally open switch 175, line 189, solenoid of valve 39, lines 191 and 161 to main 113. Valve 39 which is normally closed is thus opened.

It will be noted that relay 159 is energized when selector switch 153 is at the "Fuel" position. This is accomplished by Circuit E from main 115, line 155, switch 153, line 157, the magnet of relay 159, line 161 to main 113. Energization of relay 159 closes its normally open switch 193 to condition Circuit F from main 115, through lines 155 and 195, switch 193, line 195, pressure switch 197, which is closed when the pressure in the pipe 49 is atmospheric or below, but which is open at greater pressures, line 199, magnet of relay 167, line 161 to main 113.

Should the pressure established by the selected pump drop to atmospheric pressure, switch 197 will close and energize relay 167 to open switch 165 and break circuits A, B, C and D. At the same time, the relay closes its normally open switch 201 to establish Circuit G from main 115 through line 155, switch 201, line 203, magnet of relay 187, line 161 to main 113.

When the relay is energized it closes all of its normally open switches 205, 207 and 185.

Closure of switch 185 will close

Circuit H from main 115, through line 155, switch 201, line 203, switch 185, line 179 to the solenoids of valves 11 and 29, lines 178, 183, 161 to main 113.

Valves 11 and 29 are thus held open but valve 39 closes. Should the pressure condition be remedied, circuit H will be opened and circuits A, B, C and D will be reestablished.

Switches 205 and 207 are explained below.

Hose drain

When the selector switch 153 is set to the "Drain" position, a

Circuit J is closed from main 115 through line 209, magnet of relay 211, line 161 to main 113. This energizes the relay and closes its two normally open switches 213, 215. Switch 213 energizes Circuit K from main 115 through line 155, switch 153, line 209, switch 213, line 217, solenoid of valve 53, lines 219 and 161 to main 113. The valve 53 is thus opened. The other switch 215 closes Circuit L from main 115 through line 155, switch 153, line 209, switch 215, line 221, starting coil 225 of starter 125 to main 113. The defueling pump motor 79 is thus started.

Defueling

When it is desired to remove fuel from a tank the selector switch 153 is set to the "Defuel" position to energize Circuit M from main 115 through line 155, switch 153, line 227, magnet of relay 229, line 161 to main 113. Energization of the relay closes its normally open switches 231, 233 and 235. Closure of switch 231 establishes Circuit N from main 115 through line 155, switch 153, line 227, switch 231, line 237, line 89, solenoid of valve 39, lines 191, 161 to main 113. Valve 39 is thus opened.

Switch 233 establishes

Circuit O from main 115 through line 155, switch 153, line 227, switch 233, line 239, solenoid of valve 63, lines 241 and 161 to main 113. Normally closed valve 63 is thus opened.

Switch 235 establishes

Circuit P from main 115, through line 155, switch 153, line 227, switch 235, line 243, line 221, starter coil 225 to main 113. This closes the starter 125 and starts the defueling pump.

Refilling hose

If we assume that hose 52 has been drained, it is necessary to refill the hose before any metering occurs otherwise the measurement will be inaccurate. This is accomplished by setting the selector switch 153 to the fueling position. Since the pressure on switch 197 is substantially atmospheric until the hose is filled, this switch will be closed and circuit F will be made while circuits A, B, C and D will be broken.

As stated above circuit F will energize relay 167 and circuit G which includes relay 187 which in turn closes switches 205, 207 and 185. The switch 185 opens valves 11 and 29 through circuit H.

Switch 205 establishes

Circuit Q from main 115 through line 155, switch 201, line 203, switch 205, line 245, the solenoid of valve 53, lines 247 and 161 to main 113. The normally closed valve is accordingly opened.

Switch 207 establishes

Circuit R from main 115 through line 155, switch 201, line 203, switch 207, lines 249, 239, solenoid of valve 63, lines 251 and 161 to main 113. Normally closed valve 63 is thus opened.

Operation

To describe the operation of the system we will first assume that the hose has been emptied and wound upon the reel.

The operator will first unreel the hose 52 and insert the nozzle spout 97 in the fill opening of the tank. Valves 71 and 69 are preferably closed. He will then set valve 17 to connect the pump for the grade of fuel desired, set selector switch 153 to the "Fuel" position, close switch 117 and close the switch 141 or 149, corresponding to the grade of fuel desired. All of the switches 123, 125, 127 and 129 are normally open, all of the solenoid valves are closed and all of the relays are deenergized until one of the switches 141 or 149 is closed.

We shall assume that valve 17 has been set as shown in Figure 1 and that switch 149 has been closed.

Filling the hose

This energizes the starter coil 145, closes starter switch 129 and starts motor 77 of pump 26.

Since the pressure switch 197 is at atmospheric pressure the circuits Q and R will be energized to open the solenoid valves 53, 63, 11 and 29. Valve 11 is ineffective since no fuel is being pumped through it. Valve 39 remains closed so that no liquid can pass through the meter.

Since the nozzle valve 85 is open, liquid will flow from tank 23 through pump 26, valve 29, filter 31, line 23, valve 17, T 37, line 61, valve 63, T 55, valve 53, T 47, line 49, switch 197, hose reel 50, hose 52 and nozzle 54 into the airplane fuel tank. The air in the system upstream the filter 31 is separated in it and is returned to the top of the vented tank 23. This flow is controlled by float valve 4. The air downstream of the filter 31 is displaced ahead of the liquid and flows out of the nozzle.

Dispensing

When solid liquid reaches the nozzle valve 85, a substantial pressure will be built up in the system and pressure switch 197 will be opened. Valve 101 closes with the flow of liquid when it reaches the nozzle.

This deenergizes the circuits Q and R previously set up and energizes the circuits A, B, C and D to open the valves 11, 29, and 39. Valves 63 and 53 both close.

As before valve 11 is ineffective. The flow of liquid is now through valve 39, line 35, meter 43, line 45 and thence to the hose. Meter 43 will rotate in one direction to drive one of the registers, to wit register 116. The other register will be disconnected due to the shifting of shaft 106.

Dispensing will continue until the operator closes the nozzle valve 85 upon dispensing the required quantity of fuel.

Hose retraction

If he does not desire to evacuate the hose he will place the nozzle on the ground, return to the pit, open switch 149 to disable the pump motor 77, open the selector switch to deenergize the relays, close switch 123 to start the rewind motor 73 to reel up the hose and, when this is accomplished open switches 123 and 117 to return the system to inoperative condition.

Hose evacuation and retraction

If, on the other hand he desires to evacuate the hose, he will leave the nozzle in place in the fuel tank, will return to the pit, open switch 149 to disable the pump motor 77, open valve 69, close switch 117, move the selector switch 153 to the "Drain" position.

This energizes circuits J, K and L to open valve 53 and start defueling pump motor 79. This pump places the hose under suction and valve 101 in the nozzle opens to admit air. Liquid is accordingly pumped from hose 52, line 49, T 47, valve 53, T 55, pipe 57 and discharged through line 65, check 67, valve 69 and T 25 into the tank 23. The pumping is continued for a reasonable length of time and the selector switch is opened. The nozzle is placed on the ground and switch 123 is closed to start the rewind motor 73. When the hose has been reeled up, switches 123 and 117 are opened to place the system in the inoperative condition.

During evacuation, valves 11, 29, 39 and 63 are all closed so that the only path for liquid is that described.

Defueling

If it is desired to remove fuel from a tank, the operator must start with a full hose. If the hose has been evacuated he will first have to go through the filling cycle described above.

Assuming that the hose is full of liquid, the operator will set the selector switch to the "Defuel" position and close switch 117. This energizes the circuits M, N, O and P to open valves 63, 39 and energizes the defueling pump motor 79. Valve 69 must be manually opened.

The pump 59 will then draw fuel from the airplane tank through the hose 52, reel 50, line 49, 47, 45, meter 43 which rotates in a reverse direction, line 35, valve 39, T 37, line 61, valve 63, T 55, line 57 and pump 59. The fuel is discharged through line 65, valve 69, T 25 into tank 23.

The meter shifts shaft 106 so that the register 118 is connected to be driven and the amount of fuel removed from the tank is registered.

Different grades of fuel

To shift to the other grade of fuel, it is necessary merely to shift valve 17 to its other position. The various cycles described above will then be just the same except that valve 71 will be operated instead of valve 69; pump 8 will be effective instead of pump 26, switch 141 will be operated instead of 149 and the valve 29 will be ineffective although operated at times.

It is obvious that more than two grades of fuel may be supplied by duplicating the required equipment and properly manifolding the same in the pipe lines and paralleling it in the electrical circuits.

It is obvious that various changes may be made in the form, structure and arrangement of parts without departing from the spirit of the invention. Accordingly, applicants do not desire to be limited to the specific embodiment disclosed herein primarily for purposes of illustration; but instead, we desire protection falling fairly within the scope of the appended claims.

What we claim to be new and desire to protect by Letters Patent of the United States is:

1. In a fueling system, the combination of a source of fuel, a meter having an inlet and an outlet, said meter being operable by a flow in either direction through it, means for supplying a flow of fluid to the meter including a supply line connecting said source and inlet, a discharge line connected to the outlet, liquid moving means having an intake conduit connected to the supply line and valve means for controlling said supply line and the conduit to control the direction of flow through the meter, a pair of registers and means responsive to operation of the meter in one direction for actuating one register and responsive to operation of the meter in the other direction for operating the other register.

2. In a fueling system, the combination of a source of fuel, a meter having an inlet and an outlet, said meter being operable by a flow in either direction through it, means for supplying a flow of fluid to the meter including a supply line connecting said source and inlet, a discharge line connected to the outlet, liquid moving means having an intake, a conduit connected to the supply line, to said intake and to the discharge line, valve means for controlling the inlet to the meter, additional valve means in the conduit between the intake and the discharge and supply lines respectively, a pair of registers and means responsive to operation of the meter in one direction for actuating one register and responsive to operation of the meter in the other direction for operating the other register.

3. In a fueling system, the combination of a source of fuel, a meter connected to the source by flow supplying means, including a supply line, and to a discharge conduit, said meter being constructed for reverse operation in response to reversal of the flow of liquid through it, register means connected to be driven by the meter, a by-pass line around the meter, a pump having its suction connected to the by-pass, a normally closed valve in said by-pass on either side of the suction, a normally closed valve in the supply line on either side of the by-pass line, a control valve in the conduit and an intake valve in said conduit connected in parallel with the control valve, a control device selectively settable to one of three positions, first means operable by said device in a first position for opening the supply line valves, second means operable by said device in a second position for opening one supply and one by-pass valve to open communication between the pump and meter and third means operable by said device in a third position for opening one by-pass line valve to establish communication between the pump and discharge conduit.

4. In a fueling system, the combination of a source of fuel, a meter connected to the source by flow supplying means, including a supply line, and to a discharge conduit, said meter being constructed for reverse operation in response to reversal of the flow of liquid through it, register means connected to be driven by the meter, a by-pass line around the meter only, a pump having its suction connected to the by-pass, a normally closed valve in said by-pass on either side of the suction, a normally closed valve in the supply line on either side of the by-pass line, a control valve in the conduit and an intake valve in said conduit connected in parallel with the control valve, a control device selectively settable to one of three positions, first means operable by said device in a first position for opening the supply line valves, second means operable by said device in a second position for opening one supply and one by-pass valve to open communication between the pump and meter and third means operable by said device in a third position for opening one by-pass line valve to establish communication between the pump and discharge conduit, additional means responsive to pressure in said discharge conduit, and rendered effective by said device when it occupies its first position, for rendering said first means inoperative and for rendering additional means operative to open one supply line valve and both by-pass line valves to establish communication between the source and the discharge conduit through the by-pass.

5. In a fueling system, the combination of a source of fuel, a meter connected to the source by flow supplying means including a supply line, and to a discharge conduit, said meter being constructed for reverse operation in response to reversal of the flow of liquid through it, register means connected to be driven by the meter, a by-pass line around the meter, a pump having its suction connected to the by-pass, a normally closed valve in said by-pass on either side of the suction, a normally closed valve in the supply line on either side of the by-pass line, a control valve in the conduit and an intake valve in said conduit connected in parallel with the control valve, a control device selectively settable to one of three positions, first means operable by said device in a first position for opening the supply line valves, second means operable by said device in a second position for opening one supply and one by-pass valve to open communication between the pump and meter and third means operable by said device in a third position for opening one by-pass line valve to establish communication between the pump and discharge conduit and means for connecting the discharge from said pump to said source.

6. In a fueling system, the combination of a source of fuel, a meter connected to the source by flow supplying means, including a supply line, and to a discharge conduit, said meter being constructed for reverse operation in response to reversal of the flow of liquid through it, register means connected to be driven by the meter, a by-pass line around the meter, a pump having its suction connected to the by-pass, a normally closed valve in said by-pass on either side of the suction, a normally closed valve in the supply line on either side of the by-pass line, a control valve in the conduit and an intake valve in said conduit connected in parallel with the control valve, a control device selectively settable to one of two positions, first means operable by said device in a first position for opening the supply line valves, second means operable by said device in a second position for opening one supply and one by-pass valve to open communication between the pump and meter.

References Cited in the file of this patent

UNITED STATES PATENTS

| | | |
|---|---|---|
| 802,436 | Van Order | Oct. 24, 1905 |
| 2,017,345 | Granberg | Oct. 15, 1935 |
| 2,106,596 | Duff, Jr. | Jan. 25, 1938 |
| 2,160,741 | Jensen et al. | May 30, 1939 |
| 2,362,559 | Jauch | Nov. 14, 1944 |
| 2,537,266 | Granberg | Jan. 9, 1951 |
| 2,544,917 | Dahlem | Mar. 13, 1951 |